United States Patent [19]

Baumgartner et al.

[11] Patent Number: 5,116,907
[45] Date of Patent: May 26, 1992

[54] HEAT DISTORTION RESISTANT, THERMOPLASTIC MOLDING MATERIAL CONTAINING A COPOLYMER, PREPARATION OF THE MOLDING MATERIAL AND ITS USE

[75] Inventors: Ehrenfried Baumgartner, Roedersheim-Gronau; Adolf Echte; Juergen Mertes, both of Ludwigshafen, all of Fed. Rep. of Germany

[73] Assignee: BASF Aktiengesellschaft, Ludwigshafen, Fed. Rep. of Germany

[21] Appl. No.: 589,276

[22] Filed: Sep. 28, 1990

Related U.S. Application Data

[63] Continuation-in-part of Ser. No. 324,102, Mar. 16, 1989, Pat. No. 5,116,907.

Foreign Application Priority Data

Mar. 31, 1988 [DE] Fed. Rep. of Germany ....... 3811054
Mar. 31, 1988 [DE] Fed. Rep. of Germany ....... 3811055

[51] Int. Cl.$^5$ ................... C08L 51/00; C08F 212/10
[52] U.S. Cl. ................................... 525/77; 526/307.8
[58] Field of Search ................... 525/77; 526/307.8

[56] References Cited

U.S. PATENT DOCUMENTS

| | | | |
|---|---|---|---|
| 2,311,548 | 2/1943 | Jacobson et al. | 526/239 |
| 2,776,271 | 1/1957 | Coover, Jr. et al. | 525/77 |
| 3,010,936 | 11/1961 | Irvin | 525/77 |
| 3,378,605 | 4/1968 | Baer | 525/77 |
| 3,632,676 | 1/1972 | Schmitt et al. | 525/77 |
| 3,766,151 | 10/1973 | Huang | 526/229 |
| 4,151,333 | 4/1979 | Lenke et al. | 526/72 |
| 4,639,473 | 1/1987 | Wingler et al. | 525/77 |

FOREIGN PATENT DOCUMENTS 0330038 8/1989 European Pat. Off. ............. 525/77

Primary Examiner—Joseph L. Schofer
Assistant Examiner—N. Sarofim
Attorney, Agent, or Firm—Oblon, Spivak, McClelland, Maier & Neustadt

[57] ABSTRACT

A molding material is described which contains, in each based on the sum of A, B and C, A. from 5 to 95, in particular from 20 to 80, % by weight of a copolymer comprising
  a) from 1 to 95% by weight of styrene,
  b) not more than 40% by weight of acrylonitrile and
  c) from 5 to 98% by weight of an amide of methacrylic acid of the formula I

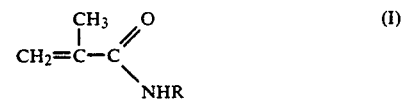

where R is primary, secondary or tertiary alkyl, cycloalkyl, aryl or aralkyl of 1 or 6 or 7, respectively, to 12 carbon atoms, with the proviso that, when alkyl is methyl or isopropyl, the copolymer has a styrene content of less than 75% by weight, B. from 5 to 60, in particular from 10 to 40, % by weight of a graft polymer B, prepared by emulsion polymerization of a mixture of styrene and acrylonitrile in the weight ratio from 60:40 to 90:10 in the presence of, based on the amount of expected copolymer, from 40 to 80, in particular from 50 to 70, % by weight of a conventional particulate, partially crosslinked diene rubber or acrylate rubber, and C. Not more than 90, in particular from 10 to 40, % by weight of a further thermoplastic resin C.

2 Claims, No Drawings

HEAT DISTORTION RESISTANT, THERMOPLASTIC MOLDING MATERIAL CONTAINING A COPOLYMER, PREPARATION OF THE MOLDING MATERIAL AND ITS USE

This application is a continuation-in-part of U.S. Ser. No. 324,102, filed Mar. 16, 1989 now U.S. Pat. No. 5,116,907.

The present invention relates to a heat distortion resistant thermoplastic copolymer of styrene, if required acrylonitrile, and an N-substituted amide of methacrylic acid and molding materials which can be obtained using this copolymer.

The relevant prior art includes
(1) U.S. Pat. No. 2,311,548,
(2) U.S. Pat. No. 4,151,333,
(3) U.S. Pat. No. 3,766,151,
(4) German Patent 1,254,287,
(5) Zh. Prikl. Spektrosk. 15, No. 2, 229-302,
(6) JA 61 247 716
(7) JA 63/273,613 and
(8) British Patent 1,354,289.

Heat distortion resistant thermoplastic molding materials based on the monomer styrene have been prepared industrially to date either by copolymerization of styrene with maleic anhydride and/or maleic N-(aryl)/(alkyl)-imides or by blending with other polymers, such as polyphenylene ethers.

The polymerization parameters of styrene and, for example, maleic anhydride do not permit random copolymerization, so that random copolymers are difficult to prepare industrially.

The blending of polystyrene with other polymers entails expensive secondary compounding procedures and gives polymer blends having the disadvantage of poor seam strength or separation phenomena occurring during processing, which may have a considerable adverse effect on the mechanical properties.

(1), (4) and (5) describe styrene/N-methylmethacrylamide copolymers which have a styrene content of 80% and more. While (4) relates to the use of these copolymers for blending with polypropylene to achieve better dyeability of polypropylene fibers, (5) describes spectroscopic data.

(6) describes an emulsion of a styrene/N-isopropylmethacrylamide copolymer (80:20) which has higher light transmittance at elevated temperatures than at low temperatures. The emulsion is used in dirt-repellent coating materials. (8) describes styrene/N-cycloalkyl-substituted acrylamide copolymers which should contain, for example, from 80 to 98% by weight of styrene in order to improve the Vicat value of homopolystyrene.

The copolymers described in (8) and consisting of styrene and phenylacrylamide have a Vicat number of about 98°-118° C. and are thus in the same range as the industrially obtainable and tested copolymers based on MA and maleimide and described at the outset.

(3) discloses terpolymers of styrene, acrylonitrile and unsubstituted acrylamide as organic pigments for paper coating compositions. Such polymers must be crosslinked, so that they can act as pigments. Crosslinking of the polymer particles formed can be inferred from the instructions given for carrying out the emulsion polymerization (cf. Examples 1 to 5). In contrast to the polymers claimed by us, such polymers cannot be processed as thermoplastics.

(7) describes copolymers of unsubstituted methacrylamide and styrene. Preparation of these copolymers is technically complicated because methacrylamide is only sparingly soluble in styrene. This is why Kanegafuchi produces them in an autoclave. At the disclosed polymerization temperature of 200° C. it is to be expected that methacrylimides are formed from adjacent methacrylamide units, with the elimination of ammonia; althouqh such methacrylimides have a high heat distortion resistance, they can be expected to exhibit poor flow properties on account of the stiffening of the polymer.

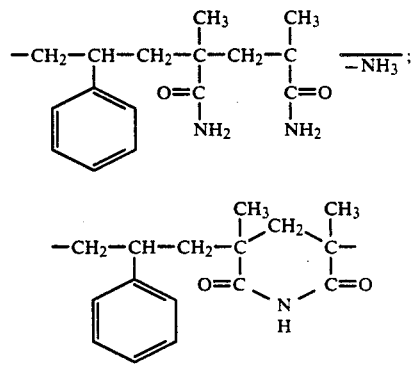

The advance in the art described in the present application is achieved by the introduction of substituents at the amide group.

(2) discloses the addition of a substituted polyacrylamide, as cell regulator, to polyphenylene oxide resins in the production of foams. Claim 19 underpins the effectiveness of the polyacrylamide used. The tert-butyl group is eliminated at elevated temperature as isobutylene which acts as an additional blowing agent. The polymer produced in Example 1 is in all likelihood also crosslinked on account of the high conversion, and hence no longer processible as a thermoplastic.

It is an object of the present invention to provide copolymers which have higher Vicat temperatures, are easy to prepare and are more resistant to chemicals than is polystyrene or its copolymer with, for example, MA, acrylamides and maleimide. Furthermore, the copolymers should havegood flow properties in the melt to enable even complicated injectionmolded articles tobe produced,and it should be easy to mix them with other styrene polymers.

We have found that this object is achieved by a copolymer of the monomers styrene, if required acrylonitrile, and an N-substituted amide of methacrylic acid, these mono-mers being used in the following ratios for polymerization:

a) from 1 to 95% by weight of styrene,
b) not more than 40% by weight of acrylonitrile and
c) from 5 to 98% by weight of an amide of methacrylic acid of the formula I

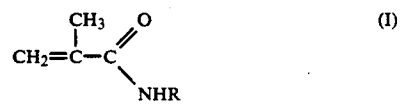

where R is primary, secondary or tertiary alkyl, cycloalkyl, aryl or aralkyl of 1 or 6 or 7, respectively, to 12 carbon atoms, with the proviso that, when alkyl is methyl or isopropyl, the copolymer has a styrene content of less than 75% by weight.

Copolymerization of styrene with N-substituted methacrylamide and, if desired, blending of the copolymers gives moldingmaterials whose glass transition temperature isconsiderably higherthanthatofpolystyrene. In contrast to the copolymerization of styrene/maleic anhydride, the monomer mixture found can be readily polymerized.

Another advantage of the novel copolymers or molding materials is the fact that they also have increased resistance to chemicals, which is evident from, for example, the insolubility in methylene chloride. Moreover, the substantially better processability (higher MFI) in comparison is noteworthy.

The molding material contains a copolymer or terpolymer of styrene and one or more N-substituted methacrylamides and, if desired, a small amount of acrylonitrile.

A novel molding material contains the following as essential constituents:

A: from 5 to 95, in particular from 20 to 80%, by weight of the above-described copolymer A of styrene, if required acrylonitrile and N-substituted methacrylamide;

B: from 5 to 60, in particular from 10 to 40%, by weight of a graft polymer B, prepared by emulsion polymerization of a mixture of styrene and acrylonitrile in the weight ratio from 60:40 to 90:10 in the presence of, based on the amount of expected copolymer, from 40 to 80, in particular from 50 to 70%, by weight of a conventional particulate, partially crosslinked diene rubber or acrylate rubber, and C: not more than 90, in particular from 10 to 40% by weight of a further thermoplastic resin C.

The following details apply to these molding material constituents A, B and C:

Copolymer A:

Styrene and the methacrylamide are each present in an amount of from 5 to 95, preferably from 10 to 90%, by weight.

If R of the amide is methyl or isopropyl, the amount of styrene is from 25 to 75, preferably from 30 to 70%, by weight.

If, furthermore, acrylonitrile is concomitantly used, the amount of styrene and/or methacrylamide is correspondingly lower.

If the molding material contains acrylonitrile, styrene (a), acrylonitrile (b) and N-substituted methacrylamide (c) are present in the terpolymer, for example, in the following percentages by weight, based in each case on a)+b)+c):

1-94, preferably 25-75, in particular 29-72%, by weight of a), 1-40, preferably 5-25, in particular 8-25%, by weight of b) and 5-98, preferably 2-65, in particular 8-62%, by weight of c).

The copolymer A contains the monomers a) and c) copolymerized in random distribution. A preferred monomer a) is styrene.

The use of α-methylstyrene or p-methylstyrene instead of styrene is also possible but is not preferred.

The monomer c) used is an amide of methacrylic acid of the formula (I)

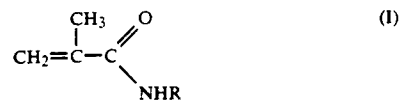

where R is primary, secondary or tertiary alkyl, cycloalkyl, aryl or aralkyl, each of not more than 12 carbon atoms.

Methyl, ethyl, isopropyl, tert-butyl, cyclohexyl, benzyl and phenyl are preferred.

In the context of the present invention, graft polymers B are, in particular, emulsion graft polymers of mixtures comprising from 10 to 40% by weight of acrylonitrile and from 90 to 60% by weight of styrene on particulate, at least partially crosslinked diene rubbers or alkyl acrylate rubbers having a mean particle size (weight average) of from 50 to 1000 nm. Preferred diene rubbers are polybutadiene, polyisoprene and butadiene copolymers containing up to 50% by weight of copolymerized monomers such as acrylonitrile, styrene, methylmethacrylate or butyl acrylate. The graft polymers B preferably contain from 40 to 80% by weight, in particular from 50 to 70% by weight, of diene rubber. The preparation of such graft polymers is known and can be carried out, for example, by free radical polymerization of a monomer mixture comprising styrene and acrylonitrile in the presence of a particulate diene rubber in the form of an aqueous emulsion. Other suitable graft polymers B are graft polymers of styrene and acrylonitrile on acrylate rubber, obtained by polymerizing alkyl acrylates of from 1 to 10 carbon atoms in the alkyl radical, in particular butyl acrylate and ethylhexyl acrylate. The acrylate rubbers which are suitable as the graft base may contain comonomers such as styrene, butadiene or methyl methacrylate, in amounts of up to 40% by weight in copolymerized form. The acrylate rubbers which are suitable as graft base are partially crosslinked and are prepared by free-radical emulsion polymerization of appropriate monomer mixtures in the presence of a copolymerizable, multifunctional monomer which causes the crosslinking. Examples of suitable crosslinking monomers are divinyl benzene, diallyl maleate, diallyl fumarate and diallyl phthalate. A particularly favorable cross-linking monomer is the acrylate ester of tricyclodecenyl alcohol (cf. German Patent 1,260,135). Graft polymers B preferably contain from 40 to 80% by weight, in particular from 50 to 70% by weight, of acrylate rubber.

Component C is preferably a copolymer of styrene or a substituted styrene and a polar monomer, such as an ester of acrylic or methacrylic acid or (meth)acrylonitrile. Particular preference is given to copolymers of styrene or α-methylstyrene and acrylonitrile.

The latter contain from 15 to 40% by weight, preferably from 20 to 35% by weight, of acrylonitrile. They can be prepared by copolymerization in bulk, solution, suspension or aqueous emulsion. The styreneacrylonitrile copolymer preferably has a viscosity number of from 40 to 100, in particular from 50 to 80. The viscosity number is determined in a manner similar to that in DIN 53,726, 0.5 g of material being dissolved in 100 ml of dimethylformamide.

The novel mixture can be prepared by first premixing components A to C at room temperature. The final blending is then preferably carried out by joint extrusion.

The novel copolymer A can be prepared by free radical or thermal polymerization, continuously or batchwise. This polymerization can be carried out as mass (solution) polymerization, mass-suspension polymerization, emulsion polymerization or suspension polymerization.

The mass polymerization of styrene and N-substituted methacrylamides may be initiated thermally and by free radicals.

In the case of thermal initiation, for example, a monomer mixture of 60 parts by weight of styrene and 40 parts by weight of N-methylmethacrylamide is heated to 150° C. in a continuous-flow stirred kettle and is polymerized at this temperature until conversions of about 40–50% are reached. The resulting heat of polymerization can be removed by evaporative cooling of the styrene (bp. 146° C.). Circulation of the polymer syrup through heat exchangers which are outside the kettle and in which the heat of polymerization can then be removed is also possible.

The polymer syrup containing about 45% by weight of copolymer can be separated into unconverted monomers and polymer melt at from 230° to 300° C. in devolatilization units, as disclosed in U.S. Pat. No. 2,941,986, or in conventional devolatilization extruders. The monomers recovered can be recycled to the polymerization kettle.

Free radical initiation of the copolymerization with, for example, peresters, acyl peroxides, peroxides, peroxydicarbonates or azo initiators, such as AIBN, permits lower polymerization temperatures. For example, a polymer conversion of 45% can be achieved at as low as 80° C. by continuously metering tert-butyl perpivalate into the polymerization kettle. The molecular weight can be regulated, inter alia, by using mercaptans. The polymer syrup is worked up in the same way as in the thermal procedure.

The use of solvents, for example ethylbenzene, toluene, xylene, cumene, acetone, methyl ethyl ketone or tetrahydrofuran, to mention but a few, permits a higher polymerization conversion in the reaction kettle without the viscosities of the reaction mixture becoming uncontrollably high. Solvents can be used both in the thermal procedure and in the procedure employing an initiator.

The mass-suspension polymerization is carried out, in particular, batchwise. Up to a polymer conversion of from 30 to 40%, the polymerization is carried out as a mass polymerization procedure, either by thermal initiation at from 120° to 155° C. or by a free radical procedure at from 60° to 130° C. After the stated conversion has been reached, 2 g of dicumyl peroxide and a solution of 2 l of water, 50 g of polyvinyl alcohol, 18 of polyvinylpyrrolidone and 1.8 g of $Na_4P_2O_7$ are added to 2 l of polymer syrup and polymerization is continued to a con-version of 98–100% using the following temperature program:
3 hours at 110° C.
3 hours at 130° C.
3 hours at 150° C.
3 hours at 180° C.

The suspension polymerization can be carried out in a conventional manner using a protective colloid. Styrene and N-methylmethacrylamide are weighed in together with water, sodium pyrophosphate, tert-butyl perbenzoate, benzoyl peroxide and tert-dodecylmercaptan; the kettle is flushed with $N_2$ and heated to 80° C. in the course of half an hour while stirring at 300 revolutions per minute. The reaction mixture is kept at this temperature for 3 hours, after which polyvinylpyrrolidine and polyvinyl alcohol, dissolved in water, are added, and the polymerization is continued for 2 hours at 90° C. Thereafter, polymerization is continued for a further 2 hours at 130° C., 2 hours at 150° C. and 2 hours at 180° C. After cooling, the beads are sieved, washed and dried.

For the emulsion polymerization, styrene, N-methylmethacrylamide, water, sodium dodecylsulfonate and potassium peroxodisulfate are predispersed using an Ultraturrax. The emulsion is introduced into a kettle equipped with a stirrer, a reflux condenser, a thermometer and a nitrogen connection, and the air is displaced with nitrogen. The emulsion is then heated to 70° C. on a water bath while stirring slowly, and, after the polymerization has started, it is continued for a further 3 hours at 70° C. The dispersion is then polymerized at 80°. After cooling, the dispersion is coagulated with acetic acid, and the polymer is separated off in a centrifuge, washed, and fed as a moist mass to a devolatilization extruder. The residual water and unconverted monomer can be removed here. The polymer melt is extruded through a die plate, and the extrudates are granulated to give cylindrical granules.

In the individual processes, the conventional assistants known for the preparation of SAN copolymers or the copolymers disclosed in (4) to (8), for example initiators, regulators, emulsifiers, protective colloids, etc., are used in conventional amounts.

Conventional additives can be used during the preparation of the copolymer A itself or afterward. Examples of additives are lubricants, mold release agents, antioxidants, antistatic agents, pigments, dyes, fillers, such as glass fibers, carbon fibers or metals in flake, powder or fiber form, and flameproofing agents. These substances can also be added to the finished molding material.

The novel molding material comprising A, B and C can be processed by the known methods for processing thermoplastics, for example by extrusion, injection molding, calendering, blow molding, pressing or sintering; the molding materials prepared by the novel processes are particularly preferably injection molded to give shaped articles for containers and lids for kitchen appliances, instrument covers for the automotive industry and lamp covers.

The novel molding material is preferably used for the production of moldings which come into contact with liquids or gases at high temperatures, for example pipes for hot wastewaters or hot liquids which are at temperatures up to 150°–170° C. It may also be used for containers for microwave apparatuses.

The following constituents were used in Examples Z1 to Z5 below. Component B1

A polybutadiene latex is prepared at 65° C. by polymerizing 60 parts of butadiene in the presence of a solution of 0.6 part of tert-dodecyl mercaptan, 0.7 part of Na $C_{14}$-alkylsulfonate as emulsifier, 0.2 part of potassium peroxodisulfate and 0.2 part of sodium pyrophosphate in 80 parts of water. When the reaction is complete, the polymerization autoclave is decompressed. The yield was 98%.

A polybutadiene is obtained whose mean particle size is 0.1 lm. The latex obtained was agglomerated by adding 25 parts of an emulsion, a copolymer of 96 parts of ethyl acrylate and 4 parts of methacrylamide having a solids content of 10 parts by weight, to give a polybutadiene latex having a mean particle size of 0.35 lm. Addition of 40 parts of water, 0.4 part of Na C₁₄-alkyl sulfonate and 0.2 part of potassium peroxodisulfate was followed by addition of 40 parts of a mixture of styrene and acrylonitrile in the ratio of 70:30 over the course of 4 hours. The polymerization was carried out while stirring the batch at 75° C. The conversion, based on styrene-acrylonitrile, was virtually quantitative. The graft rubber dispersion obtained was precipitated using calcium chloride solution, and the isolated graft copolymer was washed with distilled water. Component B2

16 parts of butyl acrylate and 0.4 part of tricyclodecenyl acrylate were warmed to 60° C. with stirring in 150 parts of water with addition of one part of the sodium salt of a C₁₂- to C₁₈-paraffinsulfonic acid, 0.3 part of potassium persulfate, 0.3 part of sodium bicarbonate and 0.15 part of sodium pyrophosphate. 10 minutes after the reaction had commenced, a mixture of 82 parts of butyl acrylate and 1.6 parts of tricyclodecenyl acrylate was added over the course of 3 hours. The mixture was then left alone for a further 1 hour. The latex obtained had a solids content of 40% by weight.

150 parts of the resultant latex were mixed with 40 parts of a mixture of styrene and acrylonitrile (weight ratio 75:25) and 60 parts of water, a further 0.03 part of potassium persulfate and 0.05 part of lauroyl peroxide were added, and the mixture was heated at 65° C. for 4 hours with stirring. The product was then precipitated at 95° C. using calcium chloride solution, washed with water and dried in a stream of warm air. The degree of grafting of the graft copolymer was 35%. Preparation of component C The following copolymer was prepared by continuous solution polymerization by a process as described, for example, in Kunststoff-Handbuch, Vieweg-Daumiller, Volume V (Polystyrol), Carl-Hanser-Verlag, Munich 1969, page 124, lines 12 ff: Styrene-acrylonitrile 65:35, viscosity number=80 ml/g.

. The parameters suitable for characterizing the molding materials were determined as follows:

The glass transition temperature, Tg, was determined by the DSC method (Tm value according to ASTM D 3418-82).

The viscosity number, VN, was measured according to DIN 53,726 on a 0.5% strength solution in dimethylformamide at 23° C.

The melt flow index, MFI, was determined according to DIN 53,735 at 200° C. and under a load of 21.6 kp and expressed in g/10 min.

The notched impact strength was determined according to DIN 53,453 at 23° C.

The Vicat softening point (Vicat B/50) was determined according to DIN 53,460.

The monomers b) required for the preparation of copolymer A were obtained by reacting methacrylic acid (ester, chloride or anhydride) with a primary or secondary amine. U.S. Pat. No. 2,311,548 describes the preparation of N-substituted methacrylamides by the reaction of methacryloyl chloride with a primary or secondary amine. N-substituted methacrylamides can also be prepared by reacting methacrylic anhydride with a primary or secondary amine (cf. German Laid-Open Application DOS 3,430,445). German Laid-Open Application DOS 3,130,508 describes the amidation of methacrylic acid with an amine at elevated temperatures with removal of the resulting water of reaction. Transamidation reactions of methyl methacrylate with amines using various catalysts are mentioned in German Laid-Open Applications DOS 2,816,516 and 3,123,970 as processes for the preparation of N-substituted methacrylamides.

In the Examples, parts and percentages are by weight, unless stated otherwise.

EXAMPLES 1 TO 33 AND COMPARATIVE EXPERIMENTS I TO III

The copolymers described in Tables 1 to 6 were prepared in a pressure reactor by mass polymerization.

The N-substituted methacrylamides were dissolved at 70° C. in the stated amount of styrene, and 0.2 part by weight of benzoyl peroxide, 0.1 part by weight of dicumyl peroxide and 0.3 part by weight of tert-dodecylmercaptan were added in each case. 20 ml of this solution were introduced into a pressure reactor, and flushing of the said reactor with nitrogen and devolatilization under reduced pressure were carried out alternately. Thereafter, polymerization was continued under a nitrogen atmosphere until conversion was virtually complete. The polymerization was carried out for 48 hours at 80° C., for 8 hours at 120° C. and for 8 hours at 170° C.

10% strength solutions of the methylene chloride-soluble polymers were prepared, and the polymers were precipitated with a 5-fold excess of ethanol, filtered off and then dried at 150° C. for 12 hours under reduced pressure. The Tg measurements (DSC method) were carried out on circular disks produced at 200° C.

Polymers which are insoluble in methylene chloride were freed from residual monomers in a drying pistol (213° C., 10 mmHg, 40 min). In this case too, the Tg measurement was carried out on circular disks produced at 200° C.

The composition, the glass transition temperature, Tg, as a measure of the heat distortion resistance, the viscosity numbers and the melt flow indices of the copolymers are also shown in the Tables.

Comparative Experiment I represents the starting point for increasing the heat distortion resistance.

Comparative Experiments II and III correspond to the prior art according to publication (2) or (4), and it should be pointed out that the heat distortion resistance is not mentioned, and was also not determined, in (2) and (4).

Table 7 shows the improved flow properties of styrene/N-substituted methacrylamide copolymers (Experiments E+F) compared with styrene/maleic anhydride copolymers or styrene/N-phenylmaleimide copolymers, the glass transi-tion temperature (Tg) being comparable and ranging from about 120° to 140° C. (Experiments A to D). The styrene/maleic anhydride and styrene/N-phenylmaleimide copolymers were prepared by solution polymerization in a continuous-flow stirred kettle.

TABLE 1

| | Styrene/N-methylmethacrylamide copolymers | | | | | |
|---|---|---|---|---|---|---|
| Example | Styrene (parts by wt.) | N-Methylmethacrylamide (parts by wt.) | Tg (°C.) | Solubility in methylene chloride (10% strength) | VN | MFI |
| 1 | 70 | 30 | 126 | Sparingly soluble | — | 39.1 |
| 2 | 60 | 40 | 136 | Sparingly soluble | — | 36.6 |
| 3 | 50 | 50 | 149 | Insoluble | — | — |
| 4 | 40 | 60 | 155 | Insoluble | — | 26.8 |
| 5 | 30 | 70 | 162 | Insoluble | — | — |
| I | 100 | 0 | 101 | Soluble | 69.3 | 80.6 |

TABLE 1-continued

Styrene/N-methylmethacrylamide copolymers

| Example | Styrene (parts by wt.) | N-Methyl-methacryl-amide (parts by wt.) | Tg (°C.) | Solubility in methyl-ene chloride (10% strength) | VN | MFI |
|---|---|---|---|---|---|---|
| 11 | 80 | 20 | 118 | Soluble | 65.8 | 60.2 |

TABLE 2

Styrene/N-cyclohexylmethacrylamide copolymers

| Example | Styrene (parts by wt.) | N-Cyclo-hexylmeth-acrylamide (parts by wt.) | Tg (°C.) | Solubility in methyl-ene chloride (10% strength) | VN | MFI |
|---|---|---|---|---|---|---|
| 6 | 90 | 10 | 110 | Soluble | 42.9 | 60.5 |
| 7 | 80 | 20 | 115 | Soluble | 42.9 | 57.8 |
| 8 | 70 | 30 | 119 | Soluble | 42.3 | 43.1 |
| 9 | 60 | 40 | 125 | Soluble | 38.3 | 44.2 |
| 10 | 50 | 50 | 130 | Soluble | 41.7 | 39.8 |
| 11 | 40 | 60 | 133 | Soluble | 40.3 | 40.2 |

TABLE 3

Styrene/N-tert-butylmethacrylamide copolymers

| Example | Styrene (parts by wt.) | N-Tert-butylmeth-acrylamide (parts by wt.) | Tg (°C.) | Solubility in methyl-ene chloride (10% strength) | VN | MFI |
|---|---|---|---|---|---|---|
| 12 | 90 | 10 | 113 | Soluble | 40.7 | 50.3 |
| 13 | 80 | 20 | 117 | Soluble | 35.8 | 47.4 |
| 14 | 70 | 30 | 120 | Soluble | 41.3 | 44.7 |
| 15 | 60 | 40 | 121 | Soluble | 36.4 | 41.5 |
| 16 | 50 | 50 | 123 | Soluble | 28.8 | 39.2 |
| 17 | 40 | 60 | 124 | Soluble | 41.0 | 38.5 |
| 18 | 30 | 70 | 142 | Soluble | 43.0 | 38.3 |

TABLE 4

Styrene/N-isopropylmethacrylamide copolymers

| Example | Styrene (parts by wt.) | N-Isoprop-ylmeth-acrylamide (parts by wt.) | Tg (°C.) | Solubility in methyl-ene chloride (10% strength) | VN | MFI |
|---|---|---|---|---|---|---|
| 19 | 70 | 30 | 108 | Soluble | 36.9 | 67.2 |
| 20 | 60 | 40 | 107 | Soluble | 33.5 | 63.1 |
| 21 | 50 | 50 | 112 | Soluble | 38.2 | 58.3 |
| 22 | 40 | 60 | 122 | Soluble | 37.6 | 54.9 |
| 23 | 30 | 70 | 131 | Soluble | 38.3 | 53.8 |
| Comparative Experiment III | 80 | 20 | 108 | Soluble | | |

TABLE 5

Styrene/N-benzylmethacrylamide copolymers

| Example | Styrene (parts by wt.) | N-Benzyl-methacryl-amide (parts by wt.) | Tg (°C.) | Solubility in methyl-ene chloride (10% strength) | VN | MFI |
|---|---|---|---|---|---|---|
| 24 | 70 | 30 | 110 | Soluble | 46.1 | 74.8 |
| 25 | 60 | 40 | 113 | Soluble | 37.1 | 73.9 |
| 26 | 50 | 50 | 116 | Soluble | 34.9 | 69.8 |
| 27 | 40 | 60 | 119 | Soluble | 35.1 | 66.4 |

TABLE 6

Styrene/N-phenylmethacrylamide copolymers

| Example | Styrene (parts by wt.) | N-Phenyl-methacryl-amide (parts by wt.) | Tg (°C.) | Solubility in methyl-ene chloride (10% strength) | VN | MFI |
|---|---|---|---|---|---|---|
| 28 | 90 | 10 | 108 | Soluble | 63.4 | 68.5 |
| 29 | 80 | 20 | 115 | Soluble | 68.4 | 63.1 |
| 30 | 70 | 30 | 123 | Soluble | 72.3 | 50.0 |
| 31 | 60 | 40 | 129 | Soluble | 73.2 | 36.5 |
| 32 | 50 | 50 | 135 | Soluble | 75.7 | 34.2 |
| 33 | 30 | 70 | 144 | Soluble | 68.6 | 33.7 |

TABLE 7

Flow properties of the various styrene copolymers

| Experiments | Type of copolymer | Composition of the copolymer [parts by weight] | TG (°C.) | VN | MFI |
|---|---|---|---|---|---|
| A | Styrene/maleic anhydride | 87.5/12.5 | 122.9 | 66.6 | 14.3 |
| B | Styrene/maleic anhydride | 76.1/23.9 | 142.3 | 78.2 | 0.5 |
| C | Styrene/N-phenyl-maleimide | 81.2/18.8 | 121.5 | 63.8 | 8.6 |
| D | Styrene/N-phenyl-maleimide | 69.2/30.8 | 139.8 | 70.6 | 0.5 |
| E | Styrene/N-phenyl-methacrylamide | 70/30 | 123 | 72.3 | 50.0 |
| F | Styrene/N-phenyl-methacrylamide | 50/50 | 135 | 75.7 | 34.2 |

EXAMPLES 34 TO 63 AND COMPARATIVE EXPERIMENTS IV AND V

The terpolymers described in Tables 8 to 13 were prepared in a pressure reactor by mass polymerization.

The N-substituted methacrylamides were dissolved at 60° C. in the stated amounts of styrene/acrylonitrile, and 0.2 part by weight of benozyl peroxide, 0.1 part by weight of dicumyl peroxide and 0.3 part by weight of tert-dodecylmercaptan were added in each case. 20 ml of this solution were introduced into a pressure reactor, and flushing of the said reactor with nitrogen and devolatilization under reduced pressure were carried out alternately. Thereafter, polymerization was continued under a nitrogen atmosphere until a conversion of >95% was reached. The polymerization was carried out for 48 hours at 80° C., for 8 hours at 120° C. and for 8 hours at 170° C.

10% strength solutions of the methylene chloride-soluble terpolymers were prepared, and the polymers were precipitated with a 5-fold excess of ethanol, filtered off and then dried at 150° C. for 12 hours under reduced pressure. The Tg measurements (DSC method) were carried out on circular disks produced at 200° C.

Terpolymers which are insoluble in methylene chloride were freed from residual monomers in a drying pistol (213° C., 10 mmHg, 40 min). In this case too, the Tg measurement was carried out on circular disks produced at 200° C.

The composition, the glass transition temperature, Tg, as a measure of the heat distortion resistance, the viscosity numbers and the melt flow indices of the terpolymers are also shown in Tables 8 to 13.

Table 14 shows the improved flow properties of a terpolymer of styrene/acrylonitrile/N-methylmethacrylamide (Experi-ment C) compared with terpolymers of styrene/acrylo-nitrile/maleic anhydride or N-phenylmaleimide (Experi-ments A+B), the glass transition temperature of each of these polymers having been brought to about 120° C.

The maleic anhydride and N-phenylmaleimide terpolymers were prepared by solution polymerization in a continuous-flow stirred kettle.

TABLE 8

Styrene/acrylonitrile/N-methylmethacrylamide terpolymers

| Example | Styrene (parts by wt.) | Acrylonitrile (parts by wt.) | N-Methylmeth-acrylamide (parts by wt.) | Tg according to DSC (°C.) | Solubility in methylene chloride (10% strength) | VN | MFI |
|---|---|---|---|---|---|---|---|
| 34 | 71 | 24 | 5 | 116 | Soluble | 63.1 | 20.2 |
| 35 | 67.4 | 22.6 | 10 | 118 | Soluble | 57.0 | 19.6 |
| 36 | 60 | 20 | 20 | 121 | Sparingly soluble | — | 17.5 |
| 37 | 52.4 | 17.6 | 30 | 124 | Insoluble | — | 12.7 |
| 38 | 45 | 15 | 40 | 127 | Insoluble | — | 9.1 |
| 39 | 30 | 10 | 60 | 131 | Insoluble | — | 6.8 |
| Comparative Experiment IV | 75 | 25 | — | 109 | Soluble | 77.2 | 21.3 |
| Comparative Experiment V | 60 | 20 | 20* | 111 | Soluble | 39.4 | 18.8 |

*N-tert-butylacrylamide according to publication (1)

TABLE 9

Styrene/acrylonitrile/N-cyclohexylmethacrylamide terpolymers

| Example | Styrene (parts by wt.) | Acrylonitrile (parts by wt.) | N-Cyclohexyl-methacrylamide (parts by wt.) | Tg according to DSC (°C.) | Solubility in methylene chloride (10% strength) | VN | MFI |
|---|---|---|---|---|---|---|---|
| 40 | 67.4 | 22.6 | 10 | 119 | Soluble | 75.6 | 20.7 |
| 41 | 60 | 20 | 20 | 121 | Soluble | 71.9 | 18.4 |
| 42 | 52.4 | 17.6 | 30 | 125 | Soluble | 66.8 | 16.3 |
| 43 | 45 | 15 | 40 | 127 | Soluble | 60.6 | 15.1 |
| 44 | 30 | 10 | 60 | 130 | Soluble | 57.3 | 13.4 |

TABLE 10

Styrene/acrylonitrile/N-benzylmethacrylamide terpolymers

| Example | Styrene (parts by wt.) | Acrylonitrile (parts by wt.) | N-Benzylmeth-acrylamide (parts by wt.) | Tg according to DSC (°C.) | Solubility in methylene chloride (10% strength) | VN | MFI |
|---|---|---|---|---|---|---|---|
| 45 | 71 | 24 | 5 | 112 | Soluble | 36.5 | — |
| 46 | 67.4 | 22.6 | 10 | 114 | Soluble | 41.1 | — |
| 47 | 63.8 | 21.2 | 15 | 116 | Soluble | 36.5 | — |
| 48 | 60 | 20 | 20 | 116 | Soluble | 35.6 | — |
| 49 | 56.2 | 18.8 | 25 | 117 | Soluble | 32.3 | — |

TABLE 11

Styrene/acrylonitrile/N-tert-butylmethacrylamide terpolymers

| Example | Styrene (parts by wt.) | Acrylonitrile (parts by wt.) | N-Tert-butylmeth-acrylamide (parts by wt.) | Tg according to DSC (°C.) | Solubility in methylene chloride (10% strength) | VN | MFI |
|---|---|---|---|---|---|---|---|
| 50 | 67.4 | 22.6 | 10 | 118 | Soluble | 72.5 | — |
| 51 | 60 | 20 | 20 | 120 | Soluble | 69.2 | — |
| 52 | 52.4 | 17.6 | 30 | 121 | Soluble | 52.2 | — |
| 53 | 45 | 15 | 40 | 125 | Soluble | 41.3 | — |
| 54 | 30 | 10 | 60 | 136 | Soluble | 37.5 | — |

TABLE 12

Styrene/acrylonitrile/N-isopropylmethacrylamide terpolymers

| Example | Styrene (parts by wt.) | Acrylonitrile (parts by wt.) | N-Isopropylmeth-acrylamide (parts by wt.) | Tg according to DSC (°C.) | Solubility in methylene chloride (10% strength) | VN | MFI |
|---|---|---|---|---|---|---|---|
| 55 | 67.4 | 22.6 | 10 | 110 | Soluble | 81.9 | — |
| 56 | 60 | 20 | 20 | 115 | Soluble | 74.9 | — |
| 57 | 52.4 | 17.6 | 35 | 119 | Soluble | 70.7 | — |
| 58 | 45 | 15 | 40 | 125 | Soluble | 56.5 | — |
| 59 | 30 | 10 | 60 | 128 | Soluble | 45.3 | — |

TABLE 13

| | Styrene/acrylonitrile/N-phenylmethacrylamide terpolymers | | | | | | |
|---|---|---|---|---|---|---|---|
| Example | Styrene (parts by wt.) | Acrylonitrile (parts by wt.) | N-Phenylmeth- acrylamide (parts by wt.) | Tg according to DSC (°C.) | Solubility in methylene chloride (10% strength) | VN | MFI |
| 60 | 67.5 | 22.5 | 10 | 112 | Soluble | 99.5 | 19.7 |
| 61 | 52.6 | 17.4 | 30 | 123 | Soluble | 87.5 | 18.4 |
| 62 | 45 | 15 | 40 | 128 | Insoluble | — | 17.1 |
| 63 | 30 | 10 | 60 | 135 | Insoluble | — | 15.8 |

TABLE 14

Comparison of the flow properties of various styrene terpolymers

| Experi- ments | Type of terpolymer | Composition of the terpolymer (parts by wt.) | Tg (°C.) | VN | MFI |
|---|---|---|---|---|---|
| A | Styrene/acryl- onitrile/MA | 67.6/22.4/10 | 122 | 80.2 | 3.0 |
| B | Styrene/acryl- onitrile/PMI | 68/10/22 | 124 | 74.7 | 4.7 |
| C | Styrene/acryl- onitrile/ N-MMAA | 52.4/17.6/30 | 124 | — | 12.7 |

MA = Maleic anhydride
PMI = N-Phenylmaleimide
N-MMAA = N-Methylmethacrylamide

EXAMPLES

Example Z1

75 parts of a copolymer comprising 70% by weight of styrene and 30% by weight of N-methylmethacryla- mide (Example 1) were mixed in a fluid mixer with 25 parts of a grafted butadiene rubber (component B1) and subsequently extruded at 250° C. in a twin-screw ex- truder (Werner & Pfleiderer ZSK 40). The following values were determined on the resultant molding mate- rial:
Vicat: 114° C.
MFI: 29 g/10 min
Notched impact strength: 9 kJ/mz

Example Z2

In a similar manner, a molding material was prepared by extrusion from 50 parts of the copolymer of styrene and N-methylmethacrylamide as in Example 1, 25 parts of the graft copolymer B1 used above and 25 parts of styreneacrylonitrile copolymer (component C, prepara- tion see above). It had the following parameters:
Vicat: 112° C.
MFI: 24 g/10 min
Notched impact strength: 11 kJ/m$^2$

Example Z3

In a similar manner, a molding material was prepared from 50 parts of a copolymer of 60% by weight of styrene and 40% by weight of N-tert-butylmethacryla- mide (Example 15), 25 parts of graft polymer B1 and 25 parts of a styreneacrylonitrile copolymer C. The fol- lowing values were measured on this material:
Vicat: 110° C.
MFI: 20 g/10 min
Notched impact strength: 12 kJ/m$^2$

Example Z4

In a similar manner, a molding material was prepared from 50 parts of a copolymer of 80% by weight of styrene and 20% by weight of N-phenylmethacryla- mide (Example 29), 25 parts of the graft polymer B1 used above and 25 parts of a styrene-acrylonitrile co- polymer C. The following values were measured on this material:
Vicat: 107° C.
MFI: 35 g/10 min
Notched impact strength: 14 kJ/m$^2$

Example Z5

Example Z4 was repeated, but the grafted butadiene rubber B1 was replaced by a grafted acrylate rubber (component B2, preparation see above). The following values were determined using this material:
Vicat 108° C.
MFI: 32 g/10 min
Notched impact strength: 11 kJ/m$^2$

We claim:
1. A molding material containing, in each case based on the sum of A, B and C,
   A. from 5 to 95% by weight of a copolymer A com- prising
      a) from 1 to 95% by weight of styrene,
      b) optionally not more than 40% by weight of acrylonitrile and
      c) from 5 to 98% by weight of an amide of meth- acrylic acid of the formula I

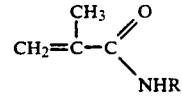

where R is primary, secondary or tertiary $C_1$–$C_{12}$ alkyl, $C_1$–$C_{12}$ cycloalkyl, $C_6$–$C_{12}$ aryl or $C_7$–$C_{12}$ aralkyl, with the proviso that, when alkyl is methyl or isopropyl, the copolymer has a sty- rene content of less than 75% by weight,
   B. from 5 to 60% by weight of a graft polymer B, prepared by emulsion polymerization of a mixture of styrene and acrylonitrile in the weight ratio from 60:40 to 90:10 in the presence of, based on the amount of expected copolymer, from 40 to 80% by weight of a particulate, partially crosslinked diene rubber or acrylate rubber, and
   C. a positive amount not more than 90% by weight of a thermoplastic resin C which is a copolymer of styrene of substituted styrene with an ester of acrylic acid or methacrylic acid, or is a copolymer of styrene or substituted styrene with acrylonitrile or methacrylonitrile.

2. The molding material of claim 1 wherein the amount of thermoplastic resin C is from 10 to 40% by weight.

* * * * *